US012807806B2

(12) United States Patent
Hwang et al.

(10) Patent No.: US 12,807,806 B2
(45) Date of Patent: Nov. 24, 2026

(54) POLYESTER RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Hee Jae Hwang, Daejeon (KR); Tae Hun Kwon, Daejeon (KR); Jae Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 397 days.

(21) Appl. No.: 18/016,842

(22) PCT Filed: Jun. 30, 2022

(86) PCT No.: PCT/KR2022/009431
§ 371 (c)(1),
(2) Date: Jan. 18, 2023

(87) PCT Pub. No.: WO2023/068481
PCT Pub. Date: Apr. 27, 2023

(65) Prior Publication Data

US 2024/0409736 A1 Dec. 12, 2024

(30) Foreign Application Priority Data

Oct. 18, 2021 (KR) ........................ 10-2021-0138292

(51) Int. Cl.
*C08L 67/02* (2006.01)
*C08J 3/20* (2006.01)
(Continued)

(52) U.S. Cl.
CPC ............... *C08L 67/02* (2013.01); *C08J 3/203* (2013.01); *C08K 13/04* (2013.01);
(Continued)

(58) Field of Classification Search
CPC ........... C08L 67/02; C08J 3/203; C08K 13/04
See application file for complete search history.

(56) References Cited

U.S. PATENT DOCUMENTS

2004/0084140 A1* 5/2004 Kobayashi .............. B29C 66/71 156/272.8
2014/0357769 A1* 12/2014 Zheng ..................... C08L 67/02 524/392

FOREIGN PATENT DOCUMENTS

JP 3321024 B2 6/2002
JP 2005-133087 A 5/2005
(Continued)

OTHER PUBLICATIONS

Guo et al. Miscibility and crystallization behavior of Poly(butylene terephthalate)/ Poly(ethylene terephthalate-co-1,4-cyclohexylene dimethylene terephthalate) blends. Polymer 290 (2024) 126568. (Year: 2024).*

(Continued)

*Primary Examiner* — John E Uselding
(74) *Attorney, Agent, or Firm* — BRYAN CAVE LEIGHTON PAISNER LLP

(57) ABSTRACT

A polyester resin composition and a molded article manufactured using the same, such as a composition capable of minimizing deviation in laser beam transmittance of molded articles even in various molding thicknesses to improve weldability. Hydrolysis resistance may be improved even under high-temperature and high-humidity conditions. In addition, deviation in laser beam transmittance may be minimized even when the thickness of an injection-molded article is changed, thereby achieving laser weldability. Accordingly, the polyester resin composition may include a base resin, glass fiber, a chain extender, a resin modifier, and a hindered amine-based compound. Such as a polyester resin
(Continued)

composition may be applied to small cameras, radomes, automobile electric/electronic equipment, or telematics parts.

12 Claims, 2 Drawing Sheets

(51) Int. Cl.

| | |
|---|---|
| ***C08K 13/04*** | (2006.01) |
| *C08K 3/34* | (2006.01) |
| *C08K 5/17* | (2006.01) |
| *C08K 7/14* | (2006.01) |

(52) U.S. Cl.

CPC ........ *C08J 2367/02* (2013.01); *C08J 2467/02* (2013.01); *C08K 2003/343* (2013.01); *C08K 5/17* (2013.01); *C08K 7/14* (2013.01); *C08L 2201/08* (2013.01); *C08L 2203/30* (2013.01); *C08L 2205/025* (2013.01); *C08L 2205/035* (2013.01); *C08L 2205/24* (2013.01)

(56) References Cited

FOREIGN PATENT DOCUMENTS

| | | | | |
|---|---|---|---|---|
| JP | 2018188545 | A | * | 11/2018 |
| JP | 2020-189898 | A | | 11/2020 |
| KR | 10-1484390 | B1 | | 1/2015 |
| KR | 10-1557439 | B1 | | 10/2015 |
| KR | 10-2016-0072716 | A | | 6/2016 |
| KR | 10-2016-0083528 | A | | 7/2016 |
| KR | 10-1760965 | B1 | | 7/2017 |
| KR | 10-2018-0076455 | A | | 7/2018 |
| KR | 10-2021-0049226 | A | | 5/2021 |
| WO | 2018-012139 | A1 | | 1/2018 |
| WO | 2019-088073 | A1 | | 5/2019 |

OTHER PUBLICATIONS

English machine translation of KR 10-2021-0049226A. (Year: 2021).*

English machine translation of KR 10-2016-0072716A. (Year: 2016).*

English machine translation of JP 2018-188545A. (Year: 2018).*

* cited by examiner

[FIG. 1]
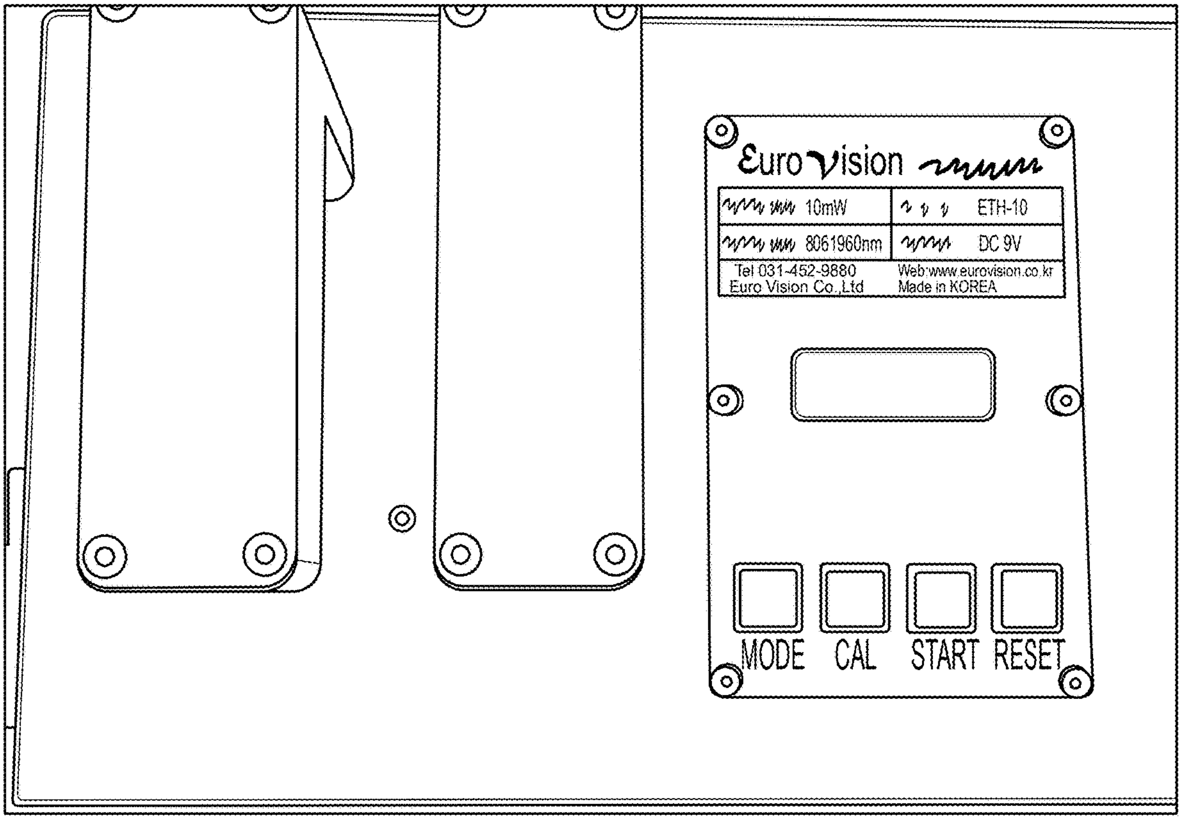

[FIG. 2]
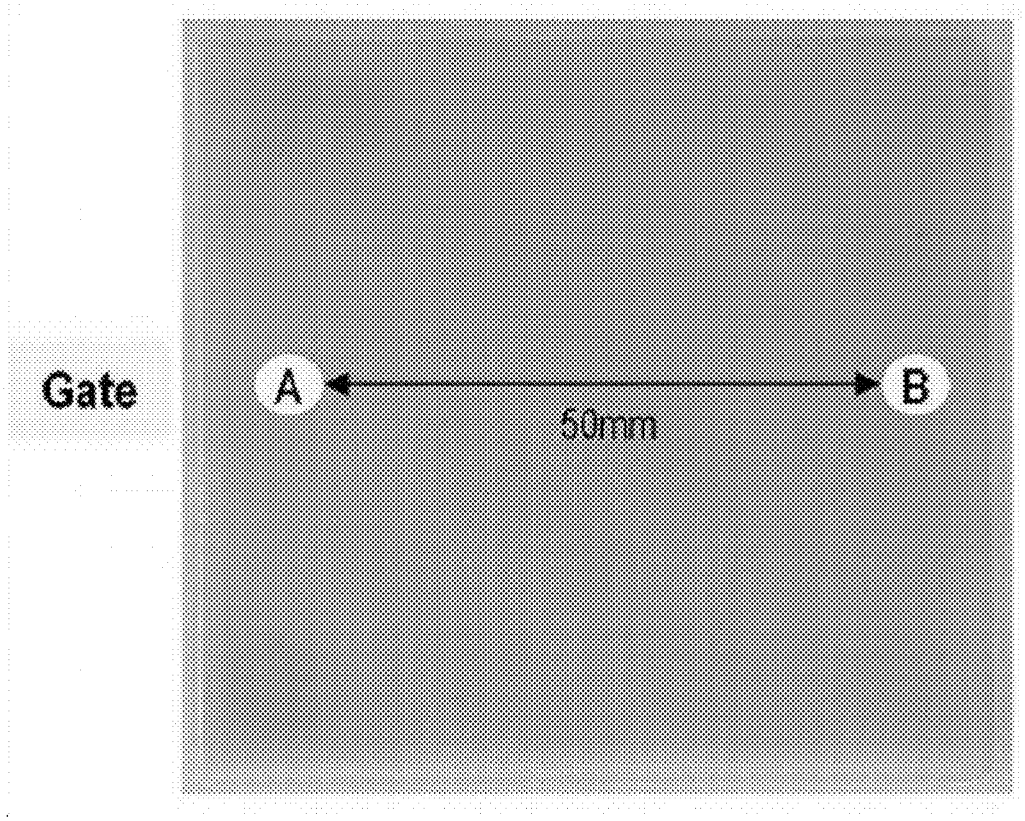

POLYESTER RESIN COMPOSITION, METHOD OF PREPARING THE SAME, AND MOLDED ARTICLE MANUFACTURED USING THE SAME

CROSS-REFERENCE TO RELATED APPLICATION

The present application is a National Phase entry pursuant to 35 U.S.C § 371 of International Application No. PCT/KR2022/009431 filed on Jun. 30, 2022, and claims priority to and the benefit of Korean Patent Application No. 10-2021-0138292, filed on Oct. 18, 2021, in the Korean Intellectual Property Office, the disclosures of which are incorporated herein by reference in their entirety.

FIELD

The present invention relates to a polyester resin composition, a method of preparing the same, and a molded article manufactured using the same. More particularly, the present invention relate to a polyester resin composition capable of minimizing deviation in laser beam transmittance of molded articles even in various molding thicknesses to improve weldability and suitable for radomes, automobile electric/electronic equipment, or telematics parts mainly used in high-temperature and high-humidity environments. The polyester resin composition of the present invention, and a molded article including this polyester resin composition, do not exhibit deterioration of physical properties by hydrolysis even under high-temperature and high-humidity conditions.

BACKGROUND

A polybutylene terephthalate resin (hereinafter referred to as "PBT resin") and/or a polyethylene terephthalate resin (hereinafter referred to as "PET resin"), which are polyester resins, have excellent mechanical and electrical properties and excellent physical and chemical properties, and thus, are used in various fields including automobiles, electrical/electronic devices, and office equipment.

Recently, a radome for protecting a radar is applied to the radar module of a car. Since the radome must transmit electromagnetic waves, PBT and/or PET are widely used in the manufacture of the radome.

In general, the exterior of a radar module is largely divided into a radome corresponding to a front body and a housing corresponding to a rear body, and the radome and the housing are respectively assembled to form the exterior of the radar module.

There are various methods of coupling a radome and a housing. Laser welding is widely used to prevent damage or deformation of electric modules included in an exterior. In addition, to forwardly emit electromagnetic waves generated from electric modules, a radome must have high electromagnetic wave transmittance. In addition, to couple a housing and a radome by welding, the radome must also have high laser beam transmittance.

According to the related art, to prevent a decrease in laser beam transmittance due to rapid crystallization of PBT, an alloy containing PET or polycarbonate (PC) that prevents crystal formation is used. In the case of the conventional method, sensitivity varies greatly depending on processing conditions, and the deviation of laser beam transmittance varies greatly depending on the position or thickness of a molded article. Accordingly, in a region between a radome and a housing coupled by welding, the deviation of laser beam transmittance is large. Accordingly, the overall laser welding characteristics are deteriorated.

Therefore, a polyester resin composition having excellent durability in high-temperature and high-humidity environments without causing deviation in transmittance even when the thickness of a molded article is changed during a laser welding process; and a part for laser transmission including a molded article manufactured using the polyester resin composition need to be developed.

RELATED ART DOCUMENTS

Patent Documents

Japanese Patent Application Publication No. 2020-189898

SUMMARY

Therefore, the present invention has been made in view of the above problems. It is one object of the present invention to provide a polyester resin composition having excellent durability in high-temperature and high-humidity environments without causing deviation in laser beam transmittance even when the thickness of a molded article is changed during a laser welding process.

It is another object of the present invention to provide a method of preparing the polyester resin composition.

It is yet another object of the present invention to provide a molded article manufactured using the polyester resin composition.

The above and other objects can be accomplished by the present invention described below.

In accordance with one aspect of the present invention, provided is a polyester resin composition, including:

100 parts by weight of a base resin including 10 to 70% by weight of a polybutylene terephthalate resin and 30 to 90% by weight of a polyethylene terephthalate resin; 5 to 200 parts by weight of glass fiber; 0.01 to 10 parts by weight of a chain extender; 0.01 to 10 parts by weight of a resin modifier; and 0.01 to 9 parts by weight of a hindered amine-based compound.

The polyester resin composition may include a nucleating agent.

The nucleating agent may be a metal salt crystallization agent.

The nucleating agent may include an asbestos-free silicate nucleating agent.

Based on 100 parts by weight of the base resin, the polyester resin composition may include the nucleating agent in an amount of 5 parts by weight or less.

The base resin may include the polybutylene terephthalate resin (PBT) and the polyethylene terephthalate resin (PET) in a weight ratio (PBT:PET) of 1:0.7 to 1:3.

The polybutylene terephthalate may have a weight average molecular weight (Mw) of 10,000 to 80,000 g/mol.

The polyethylene terephthalate may be a copolymer including one or more comonomers selected from 1,4-cyclohexanedimethanol and isophthalic acid.

The polyethylene terephthalate may have a weight average molecular weight (Mw) of 50,000 to 80,000 g/mol.

The chain extender may be a compound including an epoxy structure.

The resin modifier may be an aromatic polymer having an imide terminal group.

Based on 100 parts by weight of the base resin, the polyester resin composition may include 0.1 to 5 parts by weight of one or more additives selected from the group consisting of a heat stabilizer, a flame retardant, a flame-retardant auxiliary agent, a colorant, a release agent, a pigment, a dye, a transesterification inhibitor, an antistatic agent, an antibacterial agent, a processing aid, a metal deactivator, a non-flammable agent, a fluorine-based anti-dripping agent, an anti-friction agent, an anti-wear agent, and a coupling agent.

The polyester resin composition may be a polyester resin composition for laser welding.

When transmittance of a 980 nm wavelength laser beam is measured at one point on a surface of a specimen, that is an injection-molded article manufactured using the polyester resin composition, and the other point that does not overlap the one point, the transmittance may satisfy Equations 1 and 2 below.

$$0\% \leq |(A_1 - B_1)/B_1| \times 100 \leq 10\%, \text{ and} \quad \text{[Equation 1]}$$

$$0\% \leq |(A_{1.5} - B_{1.5})/B_{1.5}| \times 100 \leq 10\%, \quad \text{[Equation 2]}$$

wherein $A_1$ represents transmittance of a 980 nm wavelength laser beam measured at one point of a 1 T thick gate of the injection-molded article, $B_1$ represents transmittance of a 980 nm wavelength laser beam measured at the other point of the 1 T thick gate of the injection-molded article, $A_{1.5}$ represents transmittance of a 980 nm wavelength laser beam measured at one point of a 1.5 T thick gate of the injection-molded article, and $B_{1.5}$ represents transmittance of a 980 nm wavelength laser beam measured at the other point of the 1.5 T thick gate of the injection-molded article.

In accordance with another aspect of the present invention, provided is a method of preparing a polyester resin composition, the method including:

a step of kneading and extruding 100 parts by weight of a base resin including 10 to 70% by weight of a polybutylene terephthalate resin and 30 to 90% by weight of a polyethylene terephthalate resin; 5 to 200 parts by weight of glass fiber; 0.01 to 10 parts by weight of a chain extender; 0.01 to 10 parts by weight of a resin modifier; and 0.01 to 9 parts by weight of a hindered amine-based compound.

In addition, based on 100 parts by weight of the base resin, a nucleating agent may be further included in an amount of 5 parts by weight or less.

In accordance with yet another aspect of the present invention, provided is a molded article manufactured by molding the above-described polyester resin composition.

The molded article may be a radome, automobile electric/electronic equipment, or a telematics part.

A polyester resin composition according to one embodiment of the present invention includes a polybutylene terephthalate resin and a polyethylene terephthalate resin as base resins, glass fiber, a chain extender, a resin modifier, and a hindered amine-based compound. Due to these compositional characteristics, hydrolysis resistance can be improved even under high-temperature and high-humidity conditions, and manufacturing cost can be reduced while minimizing deviation in the laser beam transmittance of a conventional laser welding transmission layer material.

In addition, according to the present invention, even when processing conditions or the thickness of an injection-molded article is changed, deviation in laser beam transmittance for each area can be minimized, thereby improving laser weldability.

Therefore, the polyester resin composition and the molded article according to the present invention can be applied to the cover of a small car camera, the radome of a radar module, automobile electric/electronic equipment, a telematics part, or the like.

BRIEF DESCRIPTION OF THE DRAWINGS

FIG. 1 is an image of a transmittance meter used to measure the laser beam transmittance of the specimens of examples and comparative examples.

FIG. 2 is an image showing points where the laser beam transmittance of the specimens of examples and comparative examples is measured.

DETAILED DESCRIPTION

Hereinafter, the present invention will be described in more detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

In the present disclosure, it is to be understood that, unless stated otherwise, when a part "comprises" any element, the part may include other elements without excluding other elements.

In the present disclosure, "content" means "% by weight" unless otherwise defined.

The terms "flexural strength retention" and "bonding strength retention rate" used in the present disclosure refer to the degree to which flexural strength and bonding strength for the same specimen are maintained after standing for a certain period of time compared to flexural strength and bonding strength immediately after preparing a specimen, respectively.

In the present disclosure, the term "gate portions" are used. In the case of a resin molded article, particularly a resin molded article obtained by injection molding, traces of a gate, which are parts of a mold, remain on the surface of the molded article. The traces of the gate in the molded article are called gate portions.

When preparing a material for the cover of a small car camera, the radome of a radar module, automobile electric/electronic equipment, or a telematics part by reinforcing a base resin including a polybutylene terephthalate resin and a polyethylene terephthalate resin, a component capable of minimizing deviation in laser beam transmittance while providing hydrolytic stability was included, and the content of the component was controlled. As a result, the material had hydrolysis resistance even under high-temperature and high-humidity conditions. In addition, deviation in laser beam transmittance was minimized even when the thickness of an injection-molded article was changed, thereby achieving laser weldability. Based on these results, the present inventors conducted further studies to complete the present invention.

One embodiment of the present invention provides a polyester resin composition including a polybutylene terephthalate resin, a polyethylene terephthalate resin, glass fiber, a chain extender, a resin modifier, and a hindered amine-based compound.

The polyester resin composition may further include a nucleating agent.

In the polyester resin composition according to one embodiment of the present invention, by adjusting the weight ratio of the polybutylene terephthalate resin and the polyethylene terephthalate resin, hydrolysis resistance and laser beam transmittance may be improved under high-temperature and high-humidity conditions, and deviation in laser beam transmittance may be minimized.

Hereinafter, each component of the polyester resin composition of the present invention will be described in detail.

Polybutylene Terephthalate Resin

According to one embodiment of the present invention, the polyester resin composition includes a polybutylene terephthalate resin. As described above, the polyester resin composition may implement physical properties required for articles for transmitting laser beams by including the polybutylene terephthalate resin.

In one embodiment of the present invention, as the polybutylene terephthalate resin, a polybutylene terephthalate resin obtained by polycondensation through direct esterification or transesterification of 1,4-butanediol and terephthalic acid or dimethyl terephthalate may be used.

The polybutylene terephthalate resin (PBT), which is a base resin included in the polyester resin composition of the present invention, may have a repeat unit represented by Chemical Formula 1 below.

[Chemical Formula 1]

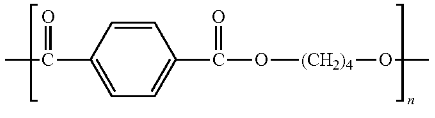

In Chemical Formula 1, n represents an average degree of polymerization in the range of 50 to 200.

In one embodiment of the present invention, to increase the impact strength of the polyester resin composition, a copolymer obtained by copolymerizing the polybutylene terephthalate resin and an impact strength enhancing compound such as polytetramethylene glycol, polyethylene glycol, polypropylene glycol, aliphatic polyester, and aliphatic polyamide or a modified polybutylene terephthalate resin obtained by mixing the polybutylene terephthalate resin and the impact strength enhancing compound may be used.

In one embodiment of the present invention, the polybutylene terephthalate resin may have an intrinsic viscosity (n) of, for example, 0.6 to 1.8 dl/g, 0.7 to 1.3 dl/g, or 0.9 to 1.3 dl/g as measured according to ASTM D2857. Within this range, a polyester resin composition having an excellent balance between mechanical properties and processability may be obtained.

The intrinsic viscosity (n) may be measured at 20° C. using a filtrate obtained by dissolving a sample to be measured in methylene chloride using an Uberode-type viscosity tube.

For example, the polybutylene terephthalate resin may have a weight average molecular weight of 10,000 to 80,000 g/mol, 20,000 g/mol to 100,000 g/mol, 30,000 g/mol to 90,000 g/mol, 40,000 g/mol to 80,000 g/mol, or 50,000 g/mol to 70,000 g/mol. Within this range, mechanical properties may be improved.

When measuring weight average molecular weight, a sample having a concentration of 1 wt % is prepared by putting tetrahydrofuran (THF) and a compound in a 1 ml glass bottle. Then, after filtering a standard sample (polystyrene) and the sample through a filter (pore size: 0.45 μm), the filtered samples are injected into a GPC injector. Then, the molecular weight and molecular weight distribution of the compound may be obtained by comparing the elution time of the sample with the calibration curve of the standard sample. At this time, Infinity II 1260 (Agilent Co.) may be used as measuring instrument, and flow rate may be set to 1.00 mL/min and column temperature may be set to 40.0° C.

In one embodiment of the present invention, for example, the polybutylene terephthalate resin may be included in the base resin in an amount of 10 to 70% by weight, 10 to 60% by weight, 20 to 70% by weight, 15 to 65% by weight, 25 to 70% by weight, 30 to 60% by weight, 35 to 60% by weight, or 40 to 60% by weight. When the polybutylene terephthalate resin is included in an amount less than this range, due to decrease in solidification rate during injection molding, problems such as increased cycle time may occur. When the polybutylene terephthalate resin is included in an amount exceeding the above range, laser beam transmittance may be significantly reduced.

Polymerization methods commonly practiced in the art to which the present invention pertains may be used to prepare the polybutylene terephthalate resin. In addition, commercially available polybutylene terephthalate resins may be used when the polybutylene terephthalate resins conform to the definition of the polybutylene terephthalate resin according to the present invention.

Polyethylene Terephthalate Resin

According to one embodiment of the present invention, the polyester resin composition includes a polyethylene terephthalate resin. As described above, the polyester resin composition may implement physical properties required for articles for transmitting laser beams by including the polyethylene terephthalate resin.

According to one embodiment of the present invention, as the polyethylene terephthalate resin, conventional polyethylene terephthalate resins may be used without particular limitation. More specifically, a co-polyethylene terephthalate polymer may be used as the polyethylene terephthalate resin.

The polyethylene terephthalate resin, which is a component of the polyester resin composition of the present invention, may have a repeat unit as a basic structure represented by Chemical Formula 2 below.

[Chemical Formula 2]

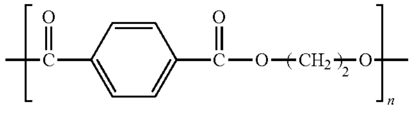

In Chemical Formula 2, n represents an integer of 1 or more, for example, an integer of 40 to 160.

In one embodiment of the present invention, to increase the impact strength of the polyester resin composition, a copolymer obtained by copolymerizing the polyethylene terephthalate resin and an impact strength enhancing compound such as polytetramethylene glycol, polyethylene glycol, polypropylene glycol, aliphatic polyester, or aliphatic polyamide, a modified polyethylene terephthalate resin obtained by mixing the polyethylene terephthalate resin and the impact strength enhancing compound, or a co-polyethylene terephthalate resin polymer including the impact strength enhancing compound or an environmentally friendly compound as a comonomer may be used. For example, 1,4-cyclohexanedimethanol or isophthalic acid may be used.

In one embodiment of the present invention, considering the processability and mechanical properties of the polyethylene terephthalate resin, the polyethylene terephthalate resin may have an intrinsic viscosity (IV, η) of, for example, 0.5 to 1 dl/g, preferably 0.52 to 1.25 dl/g as measured according to ASTM D2857. Within this range, a polyester resin composition having increased laser beam transmittance may be obtained.

For example, the polyethylene terephthalate resin may have a weight average molecular weight of 5,000 to 80,000 g/mol or 10,000 to 60,000 g/mol. Within this range, hydrolysis resistance may be improved under high-temperature and high-humidity conditions, and deviation in laser beam transmittance for each region having different thicknesses of an injection specimen may be reduced.

In one embodiment of the present invention, based on a total weight of the polyester resin composition, the polyethylene terephthalate resin may be included in an amount of 30 to 90% by weight, 40 to 90% by weight, 30 to 80% by weight, 35 to 85% by weight, 30 to 75% by weight, 40 to 90% by weight, 40 to 70% by weight, 40 to 65% by weight, or 40 to 60% by weight. Within this range, by adjusting the content of the polyethylene terephthalate resin, the mechanical properties of the polyester-based composition may be improved, and excellent laser beam transmittance may be achieved.

Polymerization methods commonly practiced in the art to which the present invention pertains may be used to prepare the polyethylene terephthalate resin. In addition, commercially available polyethylene terephthalate resins may be used when the polyethylene terephthalate resins conform to the definition of the polyethylene terephthalate resin according to the present invention.

Glass Fiber

In one embodiment of the present invention, the polyester resin composition may improve the physical properties, such as tensile strength and flexural strength, of a molded article manufactured using the polyester resin composition by including glass fiber.

According to one embodiment of the present invention, the glass fiber may be used in combination with other inorganic fibers. For example, the inorganic fibers may include one or more selected from carbon fiber, basalt fiber, and natural fiber such as kenaf or hemp.

In one embodiment of the present invention, the cross-section of the glass fiber may have a shape such as a circle, a rectangle, an oval, a dumbbell, or a rhombus. The glass fiber may have an average diameter of 7 to 20 μm or 7 to 15 μm and an average length of 2 to 6 mm or 3 to 6 mm. Within this range, excellent laser beam transmittance and mechanical property balance may be implemented.

The average diameter and average length of the glass fiber may be measured by methods commonly used in the art. For example, the diameters and lengths of 30 glass fibers may be measured using a scanning electron microscope (SEM), and the average value thereof may be calculated.

During fiber production or post-treatment process, the glass fiber may be treated with a sizing agent, and the sizing agent may include a lubricant, a coupling agent, and a surfactant.

The lubricant is mainly used to form good strands, and the coupling agent improves adhesion between the glass fiber, the polybutylene terephthalate resin, and the polyethylene terephthalate resin. When the coupling agent is appropriately selected and used in consideration of the types of a polybutylene terephthalate resin, a polyethylene terephthalate resin, and glass fiber, excellent physical properties may be imparted to the polyester resin composition.

Methods of using the coupling agent may include a method of directly treating the glass fiber with the coupling agent and a method of adding the coupling agent to the polybutylene terephthalate resin or the polyethylene terephthalate resin. To sufficiently exhibit the performance of the coupling agent, the content thereof should be appropriately selected. For example, based on 100% by weight in total (glass fiber+coupling agent) of the glass fiber, the coupling agent may be included in an amount of 0.1 to 10% by weight, 0.1 to 5% by weight, or 0.1 to 3% by weight.

For example, the coupling agent may include amine-based coupling agents, acrylic-based coupling agents, and silane-based coupling agents such as γ-aminopropyltriethoxysilane, γ-aminopropyltrimethoxysilane, N-(beta-aminoethyl) γ-aminopropyltriethoxysilane, γ-methacryloxypropyl triethoxysilane, γ-glycidoxypropyl trimethoxysilane, and β(3,4-epoxyethyl) γ-aminopropyl trimethoxysilane.

In particular, for rigidity and mechanical properties, the glass fiber of the present invention preferably contains silica.

For example, silica may be included in the glass fiber in an amount of 20 to 65% by weight, preferably 25 to 60% by weight, more preferably 30 to 55% by weight. Within this range, by adjusting the content of the glass fiber, the impact resistance and mechanical properties of the polyester-based composition may be improved. In a content less than the above range, improvement in heat resistance and mechanical properties due to addition of the glass fiber may be insignificant. In a content exceeding the above range, surface gloss may be significantly deteriorated.

In addition, aluminum oxide may be included in the glass fiber in an amount of, for example, 1 to 40% by weight or 5 to 30% by weight.

In addition, calcium oxide may be included in the glass fiber in an amount of, for example, 10 to 60% by weight or 20 to 50% by weight.

In addition, one or more selected from iron oxide, magnesia, sodium oxide, iron, and boron oxide may be included in an amount of 5% by weight or less or 0.001 to 5% by weight.

In one embodiment of the present invention, based on 100 parts by weight of the base resin, the glass fiber may be included in an amount of 5 to 200 parts by weight, 5 to 150 parts by weight, preferably 8 to 120 parts by weight. Within this range, the tensile strength and flexural strength of a molded article manufactured using the polyester resin composition may be improved.

Chain Extender

The chain extender according to the present invention may be a compound including an epoxy structure and may provide an effect of alleviating decrease in molecular weight and physical properties of the polyester resin composition due to hydrolysis.

For example, as the chain extender, one or more compounds including a glycidyl functional group may be used. As a specific example, glycidyl methacrylate-based compounds may be used.

As a specific example, the glycidyl methacrylate-based compounds may include glycidyl (meth)acrylate, ethylene-glycidyl (meth)acrylate, and novolac-type glycidyl resins, and may be selected from the group consisting of combinations of compounds including glycidyl.

For example, as the novolac-type glycidyl resin, a compound represented by Chemical Formula 3 below may be used.

[Chemical Formula 3]

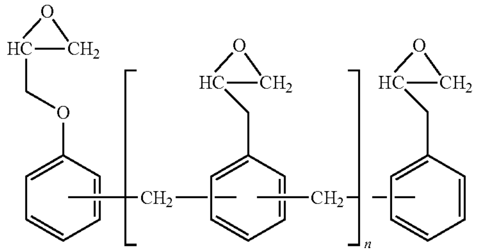

In one embodiment of the present invention, based on 100 parts by weight of the base resin, the chain extender may be included in an amount of, for example, 0.01 to 10 parts by weight, preferably 0.1 to 5 parts by weight. Within this range, hydrolysis-induced molecular weight reduction is alleviated due to chain extension, thereby realizing excellent mechanical property retention.

In the present disclosure, n represents an independent value in each chemical formula, and n in Chemical Formula 3 may be, for example, 1 or more, 1 to 100, 1 to 50, or 1 to 25.

Resin Modifier

The resin modifier according to the present invention may include aromatic group-containing carbodiimide compounds. Specifically, the resin modifier may include phenyl group-containing carbodiimide resins. When an aromatic group-containing carbodiimide resin is used as the resin modifier, the imide end group of the resin modifier acts as an acid scavenger to cap the terminal carboxyl groups of polymers constituting the base resin, thereby suppressing hydrolysis reaction.

For example, based on 100 parts by weight of the base resin, the resin modifier may be included in an amount of 0.01 to 10 parts by weight, preferably 0.1 to 5 parts by weight. Within this range, excellent mechanical properties may be maintained by preventing deterioration of mechanical properties due to hydrolysis resistance.

Hindered Amine-Based Compound

The hindered amine-based compound according to the present invention may serve as a catalyst for activating the reaction between the above-described chain extender and the end groups of the polymers constituting the base resin, thereby increasing the hydrolytic stability of the polyester resin composition.

The hindered amine-based compound may include one or more selected from the group consisting of poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino] (CAS number: 71878-19-8); reaction products of 1,6-hexanediamine, N,N'-bis(2,2,6,6-tetramethyl-4-piperidinyl),2,4,6-trichloro-1,3,5-triazine, N-butyl-1-butanamine, and N-butyl-2,2,6,6-tetramethyl-4-piperidinamine (CAS number: 192268-64-7); 1,1-bis(2,2,6,6-tetramethyl-4-piperidyl)succinate; bis(2,2,6,6-tetramethyl-4-piperidyl)sebacate; bis(1,2,2,6,6-pentamethyl-4-piperidyl)sebacate; bis(1-octyloxy-2,2,6,6-tetramethyl-4-piperidyl)sebacate; bis(1,2,2,6,6-pentamethyl-4-piperidyl)-N-butyl-3,5-di-tert-butyl-4-hydroxybenzylmalonate; condensation products of 1-(2-hydroxyethyl)-2,2,6,6-tetramethyl-4-hydroxypiperidine and succinic acid; linear or cyclic condensation products of N,N'-bis(2,2,6,6-tetramethyl-4-piperidyl) hexamethylene diamine and 4-tert-octylamino-2,6-di-chloro-1,3,5-triazine; tris(2,2,6,6-tetramethyl-4-piperidyl)nitrilotriacetate; tetrakis(2,2,6,6-tetramethyl-4-piperidyl)-1,2,3,4-butane tetracarboxylate; 1,1'-(1,2-ethanediyl)-bis(3,3,5,5-tetramethylpiperazinone); 4-benzoyl-2,2,6,6-tetramethylpiperidine; 4-stearyloxy-2,2,6,6-tetramethylpiperidine; linear or cyclic condensation products of N,N'-bis(2,2,6,6-tetramethyl-4-piperidyl)hexamethylene diamine and 4-morpholino-2,6-dichloro-1,3,5-triazine; and reaction products of 7,7,9,9-tetramethyl-2-cycloundecyl-1-oxa-3,8-diaza-4-oxospiro-[4,5]decane and epichlorohydrin, more preferably one or more selected from the group consisting of bis(2,2,6,6-tetramethyl-4-piperidyl) sebacate; 2-(2H-benzotriazol-2-yl)-4-(1,1,3,3-tetramethylbutyl)phenol; poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]; and reaction products of 1,6-hexanediamine, N,N'-bis(2,2,6,6-tetramethyl-4-piperidinyl),2,4,6-trichloro-1,3,5-triazine, N-butyl-1-butanamine, and N-butyl-2,2,6,6-tetramethyl-4-piperidinamine.

The hindered amine end group of the hindered amine-based compound may react with end groups of polymers constituting the base resin to impart hydrolysis resistance. Specifically, when using the hindered amine-based compound, gas generation during molding of the polyester-based composition may be effectively suppressed.

For example, the hindered amine-based compound may be a halogen-free alkoxy hindered amine having a weight average molecular weight of 2,200 to 2,300 g/mol.

For example, based on 100 parts by weight of the base resin, the hindered amine-based compound may be included in an amount of 0.01 to 9 parts by weight, preferably 0.1 to 4 parts by weight. Within this range, excellent hydrolysis resistance may be maintained without inhibiting the hydrolysis resistance effect provided by the aforementioned chain extender.

When the above-described chain extender and the hindered amine-based compound are used in combination, reaction between the chain extender and the end groups of the polymers constituting the base resin may be promoted, thereby increasing the hydrolytic stabilization effect of the polyester resin composition. Accordingly, it is preferable that the two substances are used in combination.

Polyester Resin Composition

The polyester resin composition according to the present invention may include the polybutylene terephthalate resin and the polyethylene terephthalate resin in a weight ratio (PBT:PET) of 1:0.7 to 1:3. Within this range, hydrolysis resistance may be improved under high-temperature and high-humidity conditions, and deviation in laser beam transmittance may be reduced.

For example, a weight ratio (PBT:PET) of 1:0.7 to 1:3 of the polybutylene terephthalate resin and the polyethylene terephthalate resin preferably includes a weight ratio (PBT:PET) of 1:0.75 to 1:2. Within this range, hydrolysis resistance may be improved under high-temperature and high-humidity conditions, and deviation in laser beam transmittance for each region having different thicknesses of an injection specimen may be reduced. When the weight ratio is less than the above range, laser beam transmittance may be significantly reduced. When the weight ratio exceeds the above range, due to decrease in solidification rate during injection molding, problems such as increased cycle time may occur.

By including a nucleating agent in the polyester resin composition, solidification rate may be increased, and deviation in laser beam transmittance may be reduced, thereby improving laser weldability.

For example, the nucleating agent may be a metal salt crystallization agent.

An asbestos-free silicate nucleating agent may be used as the nucleating agent.

Specifically, the asbestos-free silicate nucleating agent may be a reaction product obtained by reacting sodium ionomer and metallic silicate.

More specifically, the asbestos-free silicate nucleating agent may be a reaction product obtained by reacting sodium ionomer and zinc silicate.

More specifically, the asbestos-free silicate nucleating agent may be a metallic sodium silicate nucleating agent. By using the above-described asbestos-free silicate nucleating agent, deviation in laser beam transmittance may be reduced, thereby improving laser weldability.

For example, the polyester resin composition may include the nucleating agent in an amount of 5 parts by weight or less, preferably 0.1 to 4 parts by weight. Within this range, solidification rate may be increased, thereby reducing solidification time.

Additives included in the polyester resin composition according to the present invention may further include one or more selected from a heat stabilizer, a flame retardant, a flame-retardant auxiliary agent, a colorant, a release agent, a pigment, a dye, a transesterification inhibitor, an antistatic agent, an antibacterial agent, a processing aid, a lubricant, a non-flammable agent, a fluorine-based anti-dripping agent, an anti-friction agent, an anti-wear agent, and a coupling agent.

In one embodiment of the present invention, based on 100 parts by weight of the base resin, the additives may be included in an amount of, for example, 0.001 to 5 parts by weight, preferably 0.01 to 3 parts by weight. Within this range, the intrinsic properties of the additives may be effectively expressed without deteriorating the physical properties of the resin composition.

A phenolic heat stabilizer may be used as the heat stabilizer. As a specific example, the phenolic heat stabilizer may be pentaerythritol tetrakis(3-(3,5-di-tert-butyl-4-hydroxyphenyl)propionate).

Specifically, based on 100 parts by weight of the base resin, the content of the heat stabilizer may be 0.001 to 3 parts by weight or 0.002 to 2.5 parts by weight. Within this range, by adjusting the content of the heat stabilizer, excellent impact strength may be obtained, and heat deflection temperature may be increased while maintaining the deviation of the left and right values of heat deflection temperature at 3° C. or less, thereby improving heat-resistant properties and reducing flow index.

The polyester resin composition according to the present invention may also optionally include an antioxidant. The antioxidant may include a phenolic antioxidant. As described above, by using a phenolic antioxidant, polymers included in the polyester-based composition may be further stabilized. Specifically, when molding the polyester-based composition, the phenolic antioxidant may protect the composition by removing radicals of polymers included in the polyester-based composition. In the present invention, Hindered Phenolic Antioxidant 1010 may be used as the phenolic antioxidant.

Based on 100 parts by weight of the base resin, the content of the antioxidant may be 0.001 to 1 part by weight. More specifically, based on 100 parts by weight of the base resin, the content of the antioxidant may be 0.002 to 0.7 parts by weight or 0.002 to 0.5 parts by weight.

When the content of the antioxidant included in the polyester-based composition is adjusted within the above-described range, discoloration of the polyester-based composition may be prevented. In addition, by adjusting the content of the antioxidant within the above-described range, cutting or crosslinking of molecular chains of polymers included in the polyester-based composition due to oxidation may be effectively suppressed, thereby preventing deterioration of physical properties.

The lubricant may be olefin wax, and serves to help the polyester resin composition maintain excellent releasability and injection properties.

The olefin wax may be a polymer having a low melt viscosity and may be an oily solid having sliding properties and plasticity. For example, the olefin wax may include at least one selected from polyethylene wax and polypropylene wax, and commercially available olefin wax may be used.

In one embodiment of the present invention, based on 100 parts by weight of the base resin, the lubricant may be included in an amount of, for example, 0.001 to 3 parts by weight, preferably 0.01 to 2 parts by weight. Within this range, excellent releasability and injection property may be sufficiently provided.

The polyester resin composition may include a plasticizer that facilitates chain folding during crystal formation, such as glycerol, to control crystallization by increasing the point of a crystal nucleus.

The polyester resin composition is preferably a polyester resin composition for laser welding. In this case, the polyester resin composition may be referred to as a polyester resin composition for laser welding.

For example, when transmittance of a 980 nm wavelength laser beam is measured at one point on a surface of a specimen, i.e., an injection-molded article manufactured using the polyester resin composition, and the other point that does not overlap the one point, the transmittance satisfies Equations 1 and 2 below. When the transmittance satisfies Equations 1 and 2, deviation in laser beam transmittance at all points of the molded article may be minimized, and laser weldability may be improved. In addition, excellent hydrolysis resistance may be provided even under high-temperature and high-humidity conditions.

As a specific example, the distance between the one point and the other point may be 1 to 100 mm, 5 to 60 mm, or 10 to 50 mm.

$$0\% \leq |(A_1 - B_1)/B_1| \leq 10\% \quad \text{[Equation 1]}$$

$$0\% \leq |(A_{1.5} - B_{1.5})/B_{1.5}| \times 100 \leq 10\% \quad \text{[Equation 2]}$$

(In Equations 1 and 2, $A_1$ represents transmittance of a 980 nm wavelength laser beam measured at one point of a 1 T thick gate of the injection-molded article, $B_1$ represents transmittance of a 980 nm wavelength laser beam measured at the other point of the 1 T thick gate of the injection-molded article, $A_{1.5}$ represents transmittance of a 980 nm wavelength laser beam measured at one point of a 1.5 T thick gate of the injection-molded article, and $B_{1.5}$ represents transmittance of a 980 nm wavelength laser beam measured at the other point of the 1.5 T thick gate of the injection-molded article.)

For example, an injection-molded article manufactured using the polyester resin composition may have a flexural strength retention rate of 35% or more, as a specific example, 40% or more, preferably 40 to 65%, under the condition of 96 hours after performing hydrolysis resistance test under conditions of 121° C. and 100% RH. Within this range, excellent hydrolysis resistance may be provided even under high-temperature and high-humidity conditions.

For example, the polyester resin composition may have a flexural strength retention rate of 22% or more, as a specific example, 25% or more, preferably 25 to 57%, under the condition of 144 hours after performing hydrolysis resistance test under conditions of 121° C. and 100% RH. Within this range, excellent hydrolysis resistance may be provided even under high-temperature and high-humidity conditions.

For example, the polyester resin composition may have a physical property retention rate of 91% or more, as a specific example, 95% or more, preferably 95 to 100%, under the condition of 1,000 hours after performing hydrolysis resistance test under conditions of 85° C. and 85% RH. Within this range, excellent hydrolysis resistance may be provided even under high-temperature and high-humidity conditions.

Method of Preparing Polyester Resin Composition

The polyester resin composition according to the present invention may be prepared by a method known in the art. For example, the polyester resin composition may be prepared in the form of pellets by a method of melt-extruding a mixture of components and additives in an extruder, and the pellets may be used to manufacture injection-molded articles and extrusion-molded articles.

In one embodiment of the present invention, the pellets are extruded at a temperature of 240 to 300° C. or 250 to 290° C. In addition, when injecting the pellets, the temperature of a mold is preferably 40 to 120° C. When the mold temperature is 40° C. or less, the appearance may be deteriorated. When the mold temperature is 120° C. or higher, the pellets may stick to the mold, reducing releasability and increasing cooling rate. Specifically, the mold temperature may be 60 to 88° C., 70 to 80° C., or 72 to 78° C. Within this range, even when the temperature of a mold into which melt containing the polyester-based composition is injected is controlled during injection molding, deviation in laser transmittance at all points of the molded article may be minimized, thereby improving laser weldability and hydrolysis resistance even under high-temperature and high-humidity conditions.

According to one embodiment of the present invention, when the injection-molded article is manufactured through injection molding, the injection speed of melt containing the polyester resin composition may be 30 to 100 mm/s. Specifically, when the injection-molded article is manufactured through injection molding, the injection speed of melt containing the polyester resin composition may be 35 to 95 mm/s, 50 to 80 mm/s, or 60 to 70 mm/s. Within this range, when an injection-molded article is manufactured through injection molding, even when the temperature of a mold into which melt containing the polyester-based composition is injected is adjusted, deviation in laser beam transmittance at all points of the molded article may be minimized, thereby improving laser weldability and hydrolysis resistance even under high-temperature and high-humidity conditions.

For example, the method of preparing the polyester resin composition of the present invention include a step of kneading and extruding a polyester resin composition including a polybutylene terephthalate resin, a polyethylene terephthalate resin, glass fiber, a chain extender, a resin modifier, a hindered amine-based compound, a nucleating agent, and other additives. In this case, the physical property balance of rigidity, processability, and specific gravity may be realized.

Molded Article

According to another embodiment of the present invention, a molded article manufactured using the above-described polyester resin composition is provided.

For example, the molded article may be the cover of a small car camera, the radome of a radar module, automobile electric/electronic equipment, or a telematics part.

As a specific example, the molded article may be applied to a radome, automobile electric/electronic equipment, and a telematics part such as ultra-wide band (UWB), and may be applied to any parts through which laser beams are transmitted, without particular limitation.

When the radome according to an embodiment of the present invention is used as a part of a vehicle's radar module, electromagnetic waves may be easily and uniformly transmitted through the radome, so that distortion of the electromagnetic waves may be prevented. In addition, impact resistance may be improved, and manufacturing cost may be reduced.

The polyester-based composition used to form the radome according to one embodiment of the present invention may be the same as the polyester-based composition according to the above-described embodiment. That is, one embodiment of the present invention provides a radome formed by molding the polyester-based composition including a polybutylene terephthalate resin, a polyethylene terephthalate resin, glass fiber, a chain stabilizer, a resin modifier, a hindered amine-based compound, a nucleating agent, and other additives.

According to one embodiment of the present invention, the radome may be manufactured by a method including a step of extruding or injecting the polyester-based composition at a molding temperature of 230 to 300° C., preferably 250 to 290° C. Within this range, a defect-free product may be obtained, and manufacturing time and manufacturing cost may be reduced.

By adjusting the impact strength of the radome within the above-described range, the impact resistance, i.e., surface impact resistance, of the radome may be increased, thereby improving the durability of the radome.

In describing the polyester resin composition of the present invention, the method of preparing the same, and the molded article including the same, it should be noted that other conditions or equipment not explicitly described herein may be appropriately selected within the range commonly practiced in the art without particular limitation.

Hereinafter, exemplary embodiments of the present invention are described in detail so as for those of ordinary skill in the art to easily implement with reference to the accompanying drawings. However, the present invention may be implemented in various different forms and is not limited to these embodiments.

EXAMPLES

In one embodiment of the present invention, components used in preparation of the polyester resin composition are as follows.

(A) Polybutylene terephthalate resin (PBT: 0.7 to 1.12 dl/g, Mw: 10,000 to 80,000 g/mol)

(B) Polyethylene terephthalate resin (PET: copolymer containing isophthalic acid as comonomer, 0.5 to 1.0 dl/g, Mw: 5,000 to 80,000 g/mol)

(C) Nucleating agent: Asbestos-free silicate nucleating agent produced by reacting sodium ionomer and metallic silicate
(D) Glass fiber: Glass fiber (diameter: 7 to 15 um, length: 3 to 6 mm, composition: 40 to 50% of silica, 10 to 20% of aluminum oxide, and 30 to 40% of calcium oxide)
(E) Chain extender: Epoxy-containing compound (novolac resin, GMA)
(F-1) Resin modifier: Aromatic group-containing polycarbodiimide
(F-2) Hindered amine-based compound: Hindered amine light stabilizer (HALS)
(G) Additives
(G-1) Heat stabilizer: Pentaerythritol tetrakis(3-(3,5-di-tert-butyl-4-hydroxyphenyl)propionate)
(G-2) Lubricant: PE-based WAX (product name: LC102N)

Examples 1 to 4 and Comparative Examples 1 to 6

According to the components and contents shown in Tables 1 and 2 below, (A) a polybutylene terephthalate resin, (B) a polyethylene terephthalate resin, (C) a nucleating agent, (D) glass fiber, (E) a chain extender, (F-1) a resin modifier, (F-2) a hindered amine-based compound, (G-1) a heat stabilizer, and (G-2) a lubricant were mixed, and then the mixture was melted and kneaded at a temperature range of 250 to 290° C. using a twin-screw extruder (L/D=42, Φ=40 mm) to obtain a resin in the form of pellets. (G-1), (G-2), and (G-3) were added to the polyester resin composition in an amount of 0.9 to 1% by weight, satisfying a total amount of 100% by weight.

The prepared resin in the form of pellets was dried at 100° C. for 4 hours or more, and then the resin was injected at an injection temperature of 260 to 290° C. and a mold temperature of 60° C. at an injection rate of 60 mm/s using an 80 ton injection machine (Victory 80, Engel Co.) to obtain a specimen having a thickness of 1 T (1 mm) for measuring laser beam transmittance and a specimen having a thickness of 1.5 T (1.5 mm) for measuring laser beam transmittance. Then, the prepared specimens were stored at room temperature.

Test Examples

The properties of specimens prepared Examples 1 to 4 and Comparative Examples 1 to 6 were measured according to the following methods, and the results are shown in Tables 1 and 2 below.

Laser beam transmittance: For the prepared square specimen having a size of 60 mm×60 mm×1.5 mm (length×width×thickness) for measuring laser beam transmittance, using a laser transmittance meter (ETM-31, Eurovision Co.) shown in FIG. 1, laser beam transmittance was measured at point A (near the gate of a mold) and point B (50 mm away from the gate of the mold) as shown in FIG. 2. Specifically, transmittance was measured at a wavelength of 980 nm using ultra-short-range radar (USRR), and the transmittance was calculated based on a change in the intensity value of the returned beam after emitting a laser beam with an output of 10 mW to the specimen. The same measurement method were applied to a half-gate.

Hydrolysis resistance (flexural strength retention rate): Flexural strength retention rate was measured under conditions of 121° C. and 100% RH, which are HKMC Spec.

Specifically, when measuring flexural strength, a resin molded article and a laser absorbing member were welded with a laser beam having a wavelength of 980 nm to prepare a square specimen having a joint area of 60 mm (length)×1.5 mm (width). Then, while a load was applied to the specimen at a rate of 2 mm/min using an UTM apparatus (3367, INSTRON Co.), a load (pressure) at the time the joint area was bent and ruptured was measured. Compared to flexural strength measured under constant temperature and humidity (23° C., 50RH general laboratory environment), after storing for 96 hr or 144 hr in an apparatus at 121° C. and 100% RH, flexural strength was measured, and flexural strength retention rate was calculated.

Hydrolysis resistance (tensile strength retention rate): Tensile strength retention rate was measured under conditions of 85° C. and 85% RH, which are GM Spec. Specifically, compared to tensile strength measured under constant temperature and humidity (23° C., 50RH general laboratory environment), after storing for 1,000 hr in an apparatus at 85° C. and 85% RH, tensile strength was measured, and tensile strength retention rate was calculated.

Laser weldability and hydrolysis resistance were evaluated as ○ or Δ, respectively, according to the following evaluation criteria for laser weldability and hydrolysis resistance.

Evaluation of laser weldability: When difference in transmittance between point A and point B 50 mm away from point A as shown in FIG. 2 was within the maximum of 10% based on the absolute value, and the transmittance is 80% or more, it was evaluated as ○ (good laser weldability). When difference in transmittance between point A and point B 50 mm away from point A as shown in FIG. 2 exceeded the maximum of 10% based on the absolute value, or the transmittance is less than 80%, it was evaluated as Δ (poor laser weldability).

Evaluation of hydrolysis resistance: From the aforementioned hydrolysis resistance value (flexural strength retention rate value and tensile strength retention rate value), when a flexural strength retention rate for 96 hr under conditions of 121° C. and 100 RH was 35% or more, a flexural strength retention rate for 144 hr under conditions of 121° C. and 100 RH was 22% or more, and a tensile strength retention rate for 1,000 hr under conditions of 85° C. and 85 RH was 91% or more, it was evaluated as ○. When all of the above conditions were not satisfied, it was evaluated as Δ.

TABLE 1

| Classification | | Example 1 | Example 2 | Example 3 | Example 4 |
|---|---|---|---|---|---|
| Composition | (A) PET | 40.4 | 40.1 | 39.3 | 31.3 |
| | (B) PBT | 26.9 | 26.7 | 26.2 | 35.4 |
| | (C) Nucleating agent | 0.2 | 0.2 | 0.2 | — |
| | (D) Glass fiber | 30 | 30 | 30 | 30 |
| | (E) Chain extender | 0.8 | 1.2 | 1.5 | 1 |
| | (F-1) Resin modifier | 0.5 | 0.5 | 1.5 | 1 |
| | (F-2) Hindered amine-based compound | 0.3 | 0.3 | 0.3 | 0.3 |
| Laser beam transmittance | 1 T specimen gate | 95 | 94 | 94 | 95 |
| | 1 T specimen half-gate | 90 | 95 | 95 | 90 |
| | 1.5 T specimen gate | 94 | 90 | 90 | 94 |

TABLE 1-continued

| Classification | | Example 1 | Example 2 | Example 3 | Example 4 |
|---|---|---|---|---|---|
| | 1.5 T specimen half-gate | 89 | 81 | 91 | 89 |
| Hydrolysis resistance | 121° C., 100 RH [96 hr, FS retention rate] | 40% | 58% | 58% | 65% |
| | 121° C., 100 RH [144 hr, FS retention rate] | 25% | 30% | 30% | 57% |
| | 85° C., 85 RH [1,000 hr, retention rate] | 95% | 100% | 100% | 100% |
| Evaluation of laser weldability | | ○ | ○ | ○ | ○ |
| Evaluation of hydrolysis resistance | | ○ | ○ | ○ | ○ |

TABLE 2

| Classification | | Comp. Ex. 1 | Comp. Ex.2 | Comp. Ex.3 | Comp. Ex.4 | Comp. Ex.5 | Comp. Ex. 6 |
|---|---|---|---|---|---|---|---|
| Composition | (A) PET | 41.3 | 40.8 | 40.8 | 40.7 | 40.4 | 26.8 |
| | (B) PBT | 27.5 | 27.2 | 27.2 | 27.1 | 26.9 | 40.3 |
| | (C) Nucleating agent | 0.2 | 0.2 | 0.2 | 0.2 | 0.2 | — |
| | (D) Glass fiber | 30 | 30 | 30 | 30 | 30 | 30 |
| | (E) Chain extender | — | — | 0.5 | 0.2 | 0.6 | 0.6 |
| | (F-1) Resin modifier | — | 0.5 | — | 0.6 | 0.6 | 1 |
| | (F-2) Hindered amine-based compound | — | 0.3 | 0.3 | 0.3 | 0.3 | 0.3 |
| Laser beam transmittance | 1 T specimen gate | 92 | 93 | 94 | 93 | 93 | 90 |
| | 1 T specimen half-gate | 94 | 94 | 94 | 94 | 94 | 79 |
| | 1.5 T specimen gate | 87 | 88 | 90 | 88 | 88 | 88 |
| | 1.5 T specimen half-gate | 89 | 89 | 89 | 89 | 89 | 69 |
| Hydrolysis resistance | 121° C., 100 RH [96 hr, FS retention rate] | 24% | 25% | 25% | 27% | 28% | 63% |
| | 121° C., 100 RH [144 hr, FS retention rate] | 16% | 17% | 18% | 19% | 20% | 40% |
| | 85° C., 85 RH [1,000 hr, retention rate] | 80% | 82% | 83% | 83% | 85% | 100% |
| Evaluation of laser weldability | | ○ | ○ | ○ | ○ | ○ | Δ |
| Evaluation of hydrolysis resistance | | Δ | Δ | Δ | Δ | Δ | ○ |

As shown in Table 1, in the case of Examples 1 to 4 according to the present invention, by including a polybutylene terephthalate resin, a polyethylene terephthalate resin, glass fiber, a chain extender, a resin modifier (carbodiimide resin), HALS, and additives in a specific content ratio, hydrolysis resistance may be improved even under high-temperature and high-humidity conditions while minimizing deviation in the laser beam transmittance of a conventional laser welding transmission layer material. In addition, even when the thickness of an injection-molded article is changed, deviation in laser beam transmittance for each area may be minimized, thereby improving laser weldability. On the other hand, as shown in Table 2, in the case of Comparative Example 1 not containing (E) the chain extender, (F-1) the resin modifier, and (F-2) the hindered amine-based compound, hydrolysis resistance is poor under high-temperature and high-humidity conditions.

In addition, in the case of Comparative Example 2 not containing (E) the chain extender, hydrolysis resistance is poor under high-temperature and high-humidity conditions.

In addition, in the case of Comparative Example 3 not containing (F-1) the resin modifier, hydrolysis resistance is poor under high-temperature and high-humidity conditions.

In addition, in the case of Comparative Examples 4 and 5 containing a small amount of (E) the chain extender, hydrolysis resistance is poor under high-temperature and high-humidity conditions.

In addition, in the case of Comparative Example 6 in which the contents of (A) PET and (E) the chain extender in the base resin are not appropriate, hydrolysis resistance is good under high-temperature and high-humidity conditions, but deviation in laser beam transmittance is large.

In conclusion, when preparing a material for the cover of a small car camera, the radome of a radar module, automobile electric/electronic equipment, or a telematics part by reinforcing a base resin including a polybutylene terephthalate resin and a polyethylene terephthalate resin, a component capable of minimizing deviation in laser beam transmittance while providing hydrolytic stability was included, and the content of the component was controlled. As a result, the material had hydrolysis resistance even under high-temperature and high-humidity conditions. In addition, deviation in laser beam transmittance was minimized even when the thickness of an injection-molded article was changed, thereby achieving laser weldability. Accordingly, it was confirmed that the material could be applied to radomes, automobile electric/electronic equipment, or telematics parts.

The invention claimed is:

1. A polyester resin composition, comprising:

100 parts by weight of a base resin comprising 10 to 70% by weight of a polybutylene terephthalate copolymer and 30 to 90% by weight of a polyethylene terephthalate resin;

5 to 200 parts by weight of glass fiber;

0.5 to 1.5 parts by weight of an epoxy novolac resin chain extender;

0.5 to 1.5 parts by weight of an aromatic polycarbodiimide resin modifier; and 0.1 to 1.0 parts by weight of a hindered amine light stabilizer, wherein the polyethylene terephthalate copolymer comprises isophthalic acid and 1,4-cyclohexanedimethanol, and wherein the polyethylene terephthalate copolymer has a weight average molecular weight of 50,000-70,000 g/mol, wherein the base resin comprises the polybutylene terephthalate resin (PBT) and the polyethylene terephthalate resin (PET) in a weight ratio (PBT:PET) of 1:1.2 to 1:1.8, wherein the composition exhibits:

a flexural strength retention rate of at least 35% after 96 hours at 121° C./100% RH, a flexural strength retention rate of at least 22% after 144 hours at 121° C./100% RH, and a tensile strength retention rate of at least 91% after 1000 hours at 85° C./85% RH.

2. The polyester resin composition according to claim 1, further comprising a nucleating agent.

3. The polyester resin composition according to claim 2, wherein the nucleating agent is a metal salt crystallization agent.

4. The polyester resin composition according to claim 3, wherein the nucleating agent comprises an asbestos-free silicate nucleating agent.

5. The polyester resin composition according to claim 2, wherein, based on 100 parts by weight of the base resin, the nucleating agent is present in an amount of 0.1 to 5 parts by weight.

6. The polyester resin composition according to claim 1, wherein the polybutylene terephthalate has a weight average molecular weight of 10,000 to 80,000 g/mol.

7. The polyester resin composition according to claim 1, wherein, based on 100 parts by weight of the base resin, the polyester resin composition comprises 0.1 to 5 parts by weight of one or more additives selected from the group consisting of a heat stabilizer, a flame retardant, a flame retardant auxiliary agent, a colorant, a release agent, a pigment, a dye, a transesterification inhibitor, an antistatic agent, an antibacterial agent, a processing aid, a metal deactivator, a non-flammable agent, a fluorine-based anti-dripping agent, an anti-friction agent, an anti-wear agent, and a coupling agent.

8. The polyester resin composition according to claim 1, wherein the polyester resin composition is a polyester resin composition for laser welding.

9. A method of preparing a polyester resin composition, comprising:

kneading and extruding 100 parts by weight of a base resin comprising 10 to 70% by weight of a polybutylene terephthalate copolymer and 30 to 90% by weight of a polyethylene terephthalate resin; 5 to 200 parts by weight of glass fiber; 0.5 to 1.5 parts by weight of an epoxy novolac resin chain extender; 0.5 to 1.5 parts by weight of an aromatic polycarbodiimide resin modifier; and 0.1 to 1.0 parts by weight of a hindered amine light stabilizer, wherein the polyethylene terephthalate copolymer comprises isophthalic acid and 1,4-cyclohexanedimethanol, and wherein the polyethylene terephthalate copolymer has a weight average molecular weight of 50,000-70,000 g/mol, wherein the base resin comprises the polybutylene terephthalate (PBT) and the polyethylene terephthalate resin (PET) in a weight ratio (PBT:PET) of 1:1.2 to 1:1.8, wherein the composition exhibits:

a flexural strength retention rate of at least 35% after 96 hours at 121° C./100% RH, a flexural strength retention rate of at least 22% after 144 hours at 121° C./100% RH, and a tensile strength retention rate of at least 91% after 1000 hours at 85° C./85% RH.

10. The method according to claim 9, wherein, based on 100 parts by weight of the base resin, a nucleating agent is further provided in an amount of 0.1 to 5 parts by weight.

11. A molded article manufactured by molding the polyester resin composition according to claim 1.

12. The molded article according to claim 11, wherein the molded article is a radome, automobile electric/electronic equipment, or a telematics part.

* * * * *